United States Patent
Chen et al.

(10) Patent No.: US 11,761,896 B1
(45) Date of Patent: Sep. 19, 2023

(54) APPARATUS AND METHOD FOR FLUORESCENCE POLARIZATION DETECTION

(71) Applicant: PALO ALTO RESEARCH CENTER INCORPORATED, Palo Alto, CA (US)

(72) Inventors: Qiushu Chen, San Jose, CA (US); Peter Kiesel, Palo Alto, CA (US); Jacob N. Chamoun, San Mateo, CA (US); Norman Nan Shi, Palo Alto, CA (US); Noble M. Johnson, Menlo Park, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 18/077,421

(22) Filed: Dec. 8, 2022

Related U.S. Application Data

(63) Continuation of application No. 17/108,314, filed on Dec. 1, 2020, now Pat. No. 11,525,769.

(51) Int. Cl.
   *G01N 21/64* (2006.01)

(52) U.S. Cl.
   CPC ....... *G01N 21/645* (2013.01); *G01N 21/6445* (2013.01); *G01N 21/6486* (2013.01); *G01N 2021/6463* (2013.01)

(58) Field of Classification Search
   CPC .............. G01N 21/21; G01N 21/6486; G01N 2021/6463; G01N 21/645; G01N 2021/6445
   See application file for complete search history.

(56) References Cited

U.S. PATENT DOCUMENTS

| | | | |
|---|---|---|---|
| 10,578,542 B2 | 3/2020 | Cao et al. | |
| 10,613,096 B2 | 4/2020 | Yamamoto et al. | |
| 10,627,331 B2 | 4/2020 | Chandler | |
| 10,876,969 B2 * | 12/2020 | Rogers | G01N 21/6486 |
| 2008/0179539 A1 * | 7/2008 | Rasnow | G01N 21/6454 |
| | | | 250/458.1 |
| 2012/0156714 A1 | 6/2012 | O'Brien et al. | |
| 2019/0187044 A1 | 6/2019 | Appleyard | |

OTHER PUBLICATIONS

Deutsch et al., "Lymphocyte fluorescence polarization measurements with the cellscan system: Application to the SCM cancer test", Cytometry, vol. 23 (2), 1996, pp. 159-165.

(Continued)

*Primary Examiner* — David P Porta
*Assistant Examiner* — Fani Polyzos Boosalis
(74) *Attorney, Agent, or Firm* — Mueting Raasch Group

(57) ABSTRACT

An analyzing system includes a detection area with a transparent window past which an analyte moves and emits or transmits light. One or more polarizing elements receive and polarize the light into respective two or more different polarization components. One or more optical detectors receive the respective two or more polarization components and generate respective at least two signals in response. A processor is coupled to the optical detectors and configured to determine a polarization status of the light from the analyte based on the at least two signals.

20 Claims, 12 Drawing Sheets

(56) References Cited

OTHER PUBLICATIONS

Feng et al., "Multimodal quantitative imaging of brain cancer in cultured cells", Biomed Opt Express, vol. 10 (8), 2019, pp. 4237-4248.
Scott et al., "Alzheimer's disease and down syndrome: leukocyte membrane fluidity alterations", Mechanisms of Ageing and Development, vol. 75 (1), 1994, pp. 1-10.
Uy et al., "The polarization of fluorescence of DNA stains depends on the incorporation density of the dye molecules", Cytometry Part A 61A (1); 2004, pp. 18-25.
Yaroslavsky et al., "Fluorescence Polarization of Methylene Blue as a Quantitative Marker of Breast Cancer at the Cellular Level", Scientific Reports, vol. 9 (1), 2019, pp. 940.

* cited by examiner

APPARATUS AND METHOD FOR FLUORESCENCE POLARIZATION DETECTION

This application is a continuation of U.S. application Ser. No. 17/108,314 filed on Dec. 1, 2020, which is incorporated herein by reference in its entirety.

SUMMARY

The present disclosure relates to an apparatus and method for fluorescence polarization detection. In one embodiment, an analyzing system includes a detection area with a transparent window past which an analyte moves and emits or transmits light. One or more polarizing elements receive and polarize the light into respective two or more different polarization components. One or more optical detectors receive the respective two or more polarization components and generate respective at least two signals in response. A processor is coupled to the optical detectors and configured to determine a polarization status of the light from the analyte based on the at least two signals.

In another embodiment, method involves passing an analyte past a detection area and receiving light from the analyte at one or more polarizing elements that polarize the light into respective two or more different polarization angle components. The two or more different polarization angle components are directed into one or more optical detectors to generate two or more signals corresponding to the two or more different polarization angle components. A polarization status of the analyte is determined based on the two or more signals.

In another embodiment, a method involves moving a cell marked with a fluorescent dye through a transparent channel and illuminating the cell with linearly polarized light causing light to luminesce from the biological sample. The light luminescing from the biological sample is separated into two or more different polarization angle components. The two or more different polarization angle components are directed into one or more optical detectors to generate two or more corresponding signals. A polarization of the cell is determined based on the two or more signals the cell is classified based on the polarization and a luminescent intensity of the cell.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
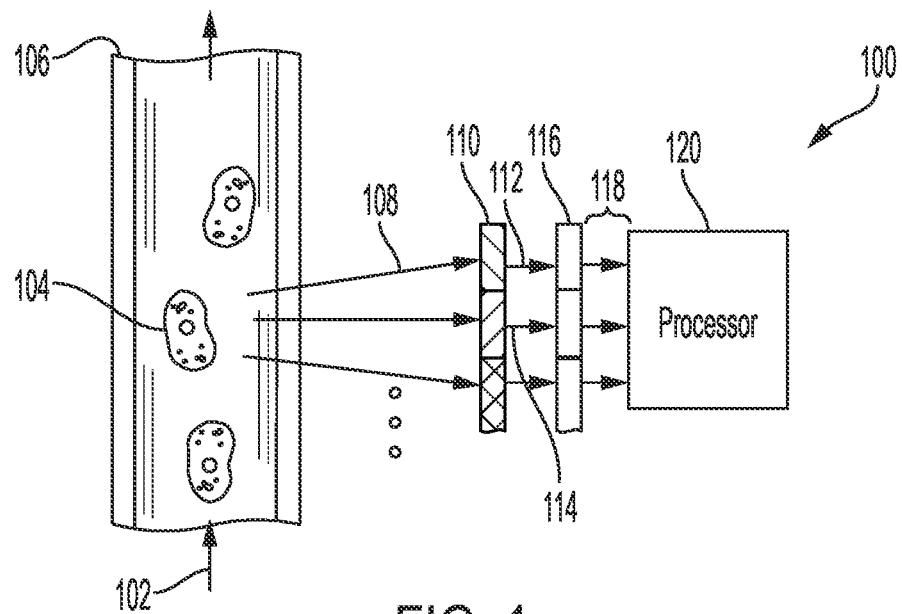
FIGS. 1-4 are block diagrams of analysis systems according to example embodiments.

The present disclosure is generally related to analyzing sample (e.g., biological samples) using measurements of light that is emitted and/or transmitted from the sample. One example of this type of method is cytometry, which is the measurement of cell characteristics. For example, quantifying the level of fluorescence polarization (Fpol) of particles (e.g., cells) in a flow cytometer can provide information on multiple aspects of the particle, including membrane fluidity, cytoplasmic microviscosity, binding affinities/activities of molecules of interest inside the particle, etc. This information can be further utilized for cancer detection, cell sub-population identification, and cell activation response monitoring.

Embodiments described below include an analyzing system that is capable of high-sensitivity, high-speed (>10-50 kHz) polarization detection. This system may be used to measure optical characteristics of any type of analyte (e.g., cells, biological samples, living organism, bacteria, beads, droplets). In some embodiments, it may be used for flow cytometry. For example, two applications under consideration for using the analyzing system include using the fluorescence polarization (Fpol) of Methylene Blue to perform cancer detection/rare CTC detection and using the Fpol of DNA staining dye to correct for staining condition variation in sperm sorting.

Fluorescence polarization measurement in a flow cytometer has been used for decades. The molecular orientation and mobility and the energy transfer between fluorophores are major factors that tune the Fpol. For DNA staining dyes, researchers found Fpol revealed the staining condition. Some diseases were shown to have a fluorescence polarization sensitivity due to change of cellular structure and membrane fluidity.

The effort in exploring fluorescence polarization in flow cytometer seems to be stagnant since 2000. This may be due to rapid development in fluorophore-conjugated biomarkers that make intensity measurement in multiple color channels dominate the flow cytometry apparatus and experiment design. Another development that has reduced interest in exploring fluorescence polarization is rapid development in polarization imaging technologies that reveals polarization information with high spatial resolution. Since Fpol is affected by multiple factors, multimodal information is always preferred. But detectors suitable for the flow cytometer application are usually expensive and bulky, which prevent the easy demonstration of multi-modal flow cytometric detection.

Being able to capture the polarization information in a flow cytometer setting is still of great interest. On one hand, flow cytometry offers easy access to large number statistics and sorting. On the other hand, Fpol offers supplementary information on the particles under investigation, which will provide insight into analysis and sorting for flow cytometry applications. As described below, an analyzing system includes features that facilitate measuring polarization status for purposes such as flow cytometry, and may be useful for other types of analyses where polarization statistics of analytes is useful.

In FIG. 1, a block diagram shows an analyzing system 100 according to an example embodiment. The system includes a fluidic stream 102 guiding an analyte 104 to a detection area 106 where the analyte 104 emits or transmits light 108. The fluidic stream 102 may be liquid or gas, e.g., a jet-in-air channel, a microfluidic channel, etc. One or more polarizing elements 110 polarize the light into respective two or more different polarization components 112, 114. One or more optical detectors 116 receive the respective two or more polarization components and generate at least two respective signals 118 in response. The optical detectors 116 may include silicon photomultiplier arrays, photomultiplier tubes, avalanche photodiode, PIN photodiodes, etc. A processor 120 is coupled to the optical detectors 116 and configured to determine the polarization status of the light 108 from the object based on the signals 118.

The detection area 106 may be a channel that is transparent to the wavelength of the light 108, or has a transparent window on at least one side. The analyte 104 may give off its own light (e.g., bioluminescence, chemiluminescence, with intrinsic anisotropy of emission dipole). In other embodiments, the analyte 104 may be photoluminescent and externally illuminated by a light source (see FIG. 2). The analyte 104 may be marked with a fluorescent dye, for example, which fluoresces when illuminated by a light source.

Photomultiplier tubes (PMTs) are often adopted as optical detectors in flow cytometers. For example, BD Influx™ system offers a polarization-sensitive detection module based on two PMTs mounted under Brewster angles. Some embodiments described below use silicon photomultipliers (SiPMs) instead of PMTs for polarization sensitive detection for flow cytometry optical detection. Compared to PMTs, SiPM has some advantages in forming a polarization detector. For example, SiPMs operate under relative low voltage (~30V vs >100V for PMTs). Also, SiPMs are insensitive to magnetic fields, are mechanically robust, have uniform response across the entire sensing area and little variance between different detectors. Generally, SiPMs are compact in size and are easy to build into arrays for compact multi-parameter detection modules. SiPMs are also less costly per detector channel by a factor of 5-10× compared to PMTs. While the embodiments below are described using SiPM detectors, in some embodiments, a semiconductor array using photodiodes and avalanche photodiodes may also be used in place of SiPM.

Use of a SiPM array allows for improved Fpol sensitivity because of their small size/same detection path/closely spaced detectors/insensitivity to misalignment. A SiPM-based fluorescence-polarization detection module can be combined with position correction. This allows for improved fluorescence-polarization detection, e.g., for rare cancer detection where typically a larger sample volume has to be measured. By using a 2×2 (or larger) SiPM array, two or more detector elements can be used to determine the Fpol.

In some embodiments, Fpol detection can be combined with a spatial modulation technique to gain image information (e.g., size and shape) and color co-localization. Some embodiments can be used to design a compact all-in-one detector suitable for Fpol analyzing system. This analyzing system may be designed to minimize the loss in polarization decomposition, e.g., by using polarization beam splitters or birefringence prisms, thus preserving as many as possible photons for detection. The analyzing system can be applied in a wider intensity range as a result. Dim fluorescence signal can also be measured in a polarization-sensitive manner such as in auto-fluorescence cases. A small footprint allows the detector to fit into tight space and be readily adapted to many commercial flow cytometers.

Figure 2:
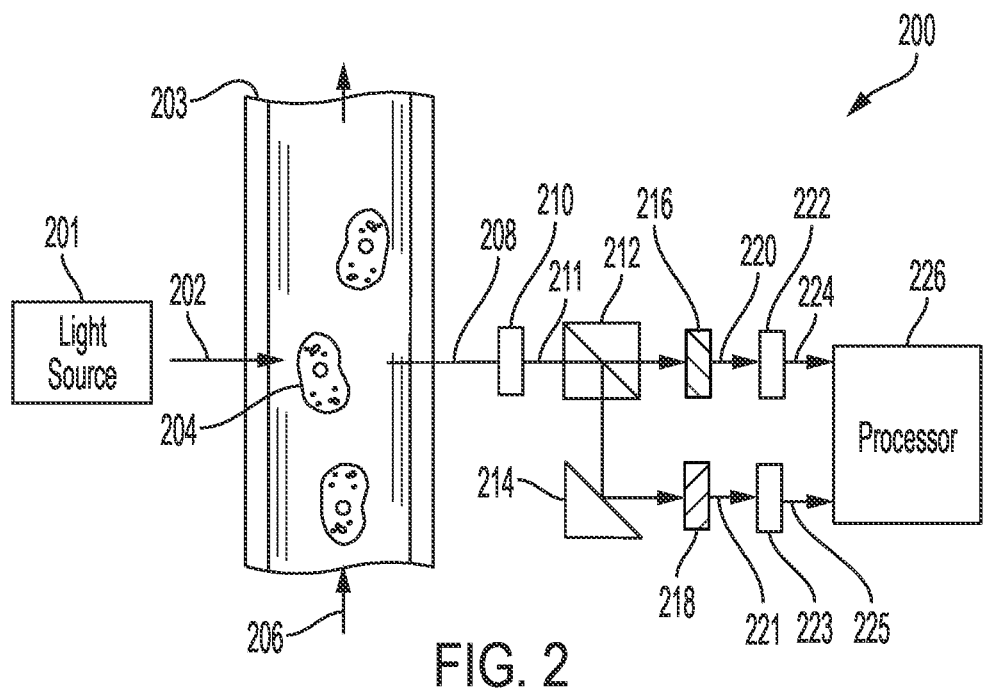

In FIG. 2, a diagram illustrates an analyzing system 200 according to another example embodiment. In this example, a light source 201 directs light 202 through a channel 203. The light source 201 may be linearly polarized, e.g., a coherent light source (laser) with certain polarization or a non-coherent excitation light source (e.g., LED) with or without a polarizer. If excitation is isotropic (e.g., an LED without polarizer), the intrinsic anisotropy of emission dipole orientation can be studied.

A sample/analyte 204 passes through the channel 203 as indicated by arrow 206. The light 202 causes fluorescent emission of the analyte 204 (e.g., optically excites a dye contained within the analyte). This causes emitted light 208 to leave the channel, which includes the fluorescent emissions and may also include some amount of the excitation light 202. The stray excitation light 202 may be filtered by a fluorescence bandpass color filter 210, which selects a fluorescence band of interest for polarization measurements.

The filtered emitted light 211 is input to a polarization beam splitter 212, which directs part of the light to a mirror 214. The light components exiting the beam splitter 212 and mirror 214 may be passed through additional polarizers 216, 218 which further reject light leaking from unwanted directions. Two polarized components 220, 221 of the light illuminate respective optical detectors, which are here shown as SiPM arrays 222, 223 for purposes of illustration. The SiPM arrays 222, 223 produce electrical signals 224, 225 that are received by a processor 226. The processor 226 determines a polarization status of the emitted light 208, which may reflect, for example, a fluorescence polarization of the analyte 204.

Figure 3:
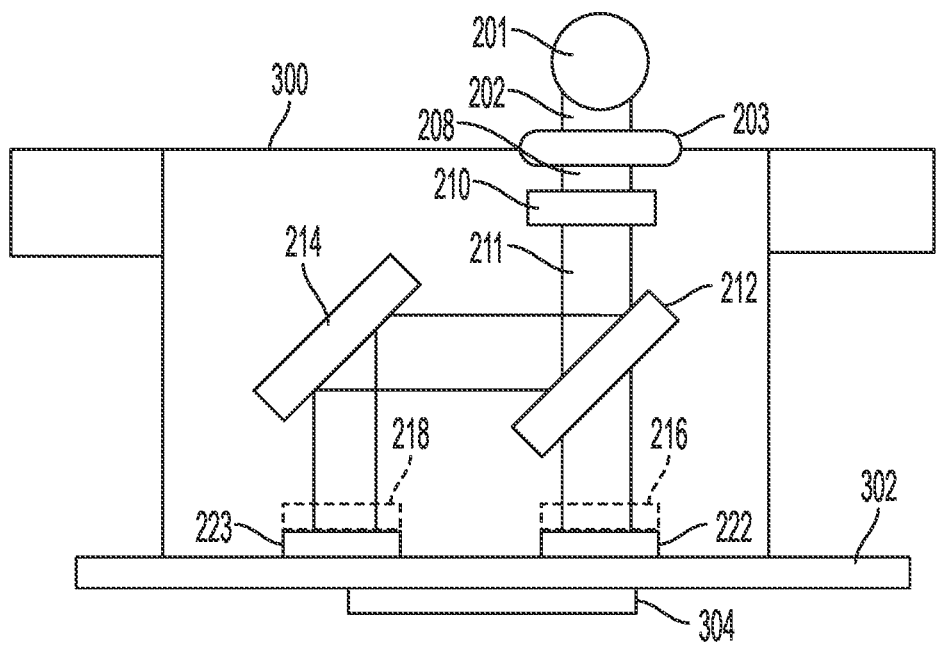

The two SiPM detector arrays 222, 223 shown in FIG. 2 can be used in a fluorescence polarization detector with high speed, high sensitivity, and a small feature size. For example, FIG. 3 is a diagram showing components of the system of FIG. 2 within an optical housing 300 and with a circuit board 302 on which are mounted the SiPM arrays 222, 223 and processing circuitry 304. The housing 300 may be an optical quality housing that is 3D printed using a black SLA resin, RenShape SL 7820. The processing circuitry 304 may at least include signal processing components (e.g., analog-to-digital converters, filters, data transmission channels) that interface with the SiPM arrays 222, 223. The processor 226 shown in FIG. 2 may being included with the processing circuitry 304 or may be located elsewhere, e.g., on a standalone computer that interfaces with circuitry 304 via a wired or wireless data transmission line.

Generally, the system 200 decomposes the incoming light according to its polarization components and directs each polarization component 220, 221 onto one SiPM 222, 223 for detection. Both detectors 222, 223 may have individual amplification circuits (e.g., transimpedance amplifiers) and individual digitizer channels. For some embodiments, one polarization detection direction is tuned parallel to the excitation polarization direction of the source light 202 and the other perpendicular to this polarization direction. Equation (1) is used to determine the polarization of the incoming light, where $I_\parallel$ and $I_\perp$ respectively denote the light intensity measured in the channel parallel and perpendicular to the excitation polarization direction:

$$P = \frac{I_\parallel - I_\perp}{I_\parallel + I_\perp} \tag{1}$$

As shown in FIG. 2, the emitted light 211 is decomposed by a polarization-dependent beam splitter 212, where p light will be transmitted and s light reflected with T/R>90%. In other embodiment, the light 211 may be decomposed by a birefringence prism (e.g., Wollaston prism) where s and p light will exit the end-facet of the prism with a different angle. In some embodiments, the light is decomposed by a polarization-independent beam splitter into two spatial directions first and then linear polarizers are used to pick polarized components perpendicular to each other in the second place.

Generally, the system may provide means to perform alignment and calibration of the detector prior to real test. The two SiPMs 222, 223 should give identical response to unpolarized light. For example, when a fixed intensity, linearly polarized calibration light is shone onto the detector, two SiPMs 222, 223 should provide the same output voltage when the calibration polarization direction is tuned parallel to each detector's detection direction. Imbalanced output can result from un-matched loss in each optical path. A bias-controlled voltage of each SiPM 222, 223 can be adjusted accordingly to compensate. The calibration procedure can take advantage of the SiPM's homogeneous sensitivity across sensor area and linear dependency of gain on control voltage. This may be used in applications where the measured polarization value is to be compared across different instruments/laboratories. For Fpol detection with high resolution, the fluorescence decomposition should be done as close to the detector as possible. The small size of the SiPM arrays enables various approaches for fluorescence decomposition close to the individual detector elements.

Note that while the systems shown in FIGS. 1-3 extract two polarization components, in some embodiments, it may be desirable to extract more than two polarization components. Because of statistical variability in the dipole axis of the fluorophores, it can be shown that the fluorescence emission is always partially polarized even for a linearly polarized excitation. The 4-component Stokes vector $S=(S_0, S_1, S_2, S_3)$ fully describes the polarization state of partially polarized light. Because a Stokes vector has four components, it can be measured by using a minimum of four combinations of polarizer/wave plate angles. This measurement could be implemented in a cytometer using a detector with a patterned polarizer/wave plate array that uses the linear motion of the cell through the field of view to encode the Stokes parameters in time.

Figure 4:
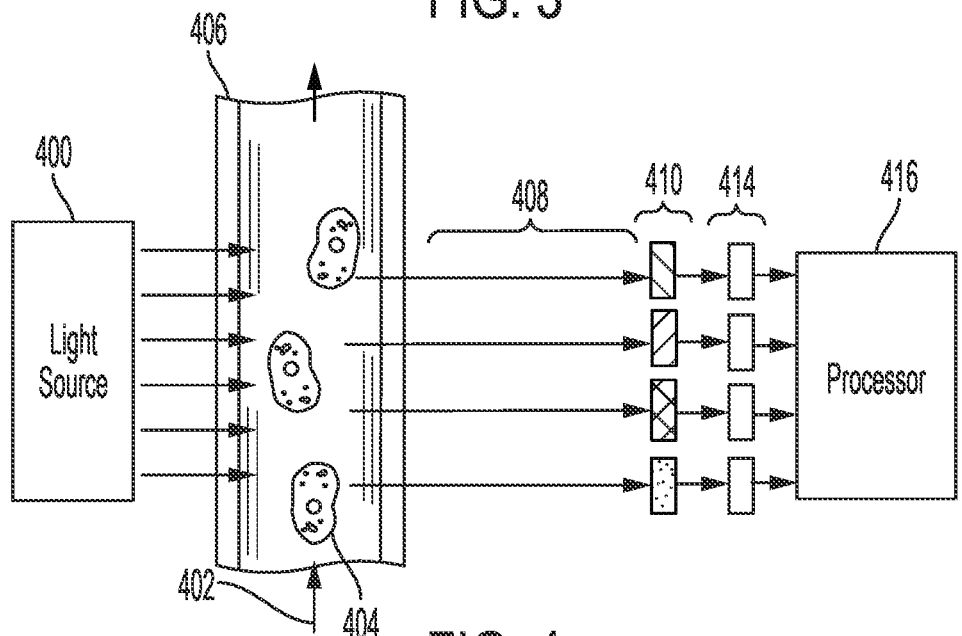
Figure 5:
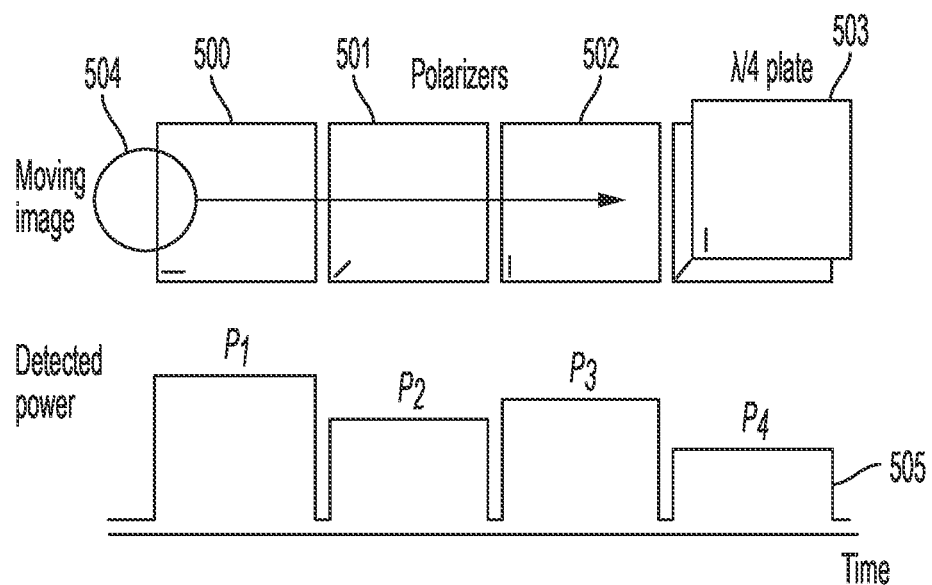
FIG. 5 is a block diagram showing operation of a system according to an example embodiment.

One example using the four polarization measurements is shown in the diagrams of FIGS. 4 and 5. A light source 400 illuminates along a line that is aligned with a direction 402 of movement of analytes 404 through a transparent channel 406. This causes an emission of light 408 from the analytes 404 which is passed through four different polarizers and/or wave plate angles 410 and received by four optical detectors 414. A processor 416 receives signals from the optical detectors 414 and processes them as described elsewhere herein. Note that this arrangement could be used for purposes similar to the embodiments in FIGS. 1-3 by using just two of the appropriate polarizers and associated detectors.

In FIG. 5, a schematic diagram shows an example where a moving image 504 produced by an analyte moving through the channel while being illuminated passes by three polarizers 500-502 (having angles of 0°, 45°, and 90° and a circular analyzer 503, which may include a λ/4 waveplate with a linear polarizer at 45° with respect to the fast axis of the waveplate. Trace 505 represents a power signal measured from the detectors. Note that this scheme can use as few as one optical detector that has an area large enough to overlap the polarizers/waveplate 500-503. In such an arrangement, a processor can determine the information from the power signal 505 via a time domain signal of the one detector.

The power signal 505 has four different levels $P_1$, $P_2$, $P_3$, $P_4$ corresponding to different component through polarizers/wave plates 500-503. In this case the elements of the Stokes vector are given by Equations (2.1)-(2.4) below $$S_0 = P_3 + P_1 \tag{2.1}$$

$$S_1 = P_3 - P_1 \tag{2.2}$$

$$S_2 = 2P_2 - S_0 \tag{2.3}$$

$$S_3 = S_0 - 2P_4 \tag{2.4}$$

Figure 6:
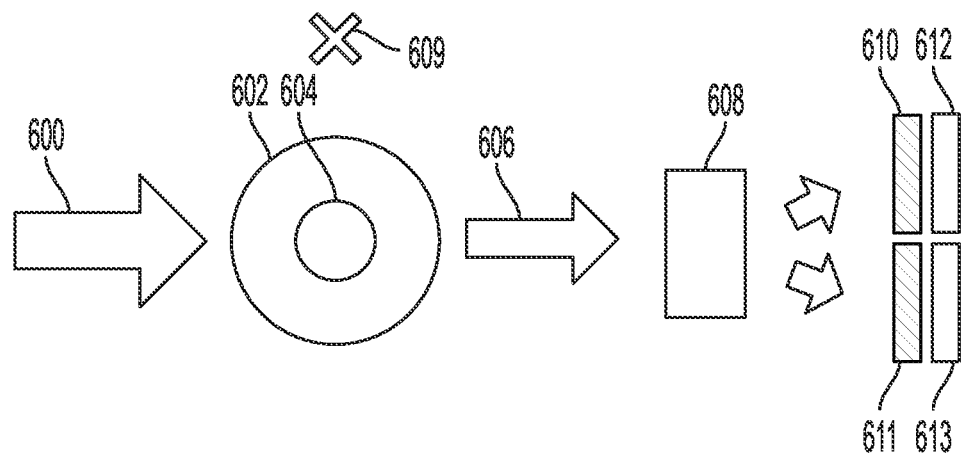
FIG. 6 is a block diagram of an analysis system according to another example embodiment.

Many other arrangements of polarizers/wave plates are possible with the constraints that (1) a quarter wave plate is used, (2) reorientation of either the polarizer, quarter wave plate, or both between measurements, and (3) no fewer than four measurements are made. Other arrangements may have better performance with regards to noise or tolerance to misalignments of the rotational axes of the polarizers/quarter wave plates. In FIG. 6, a diagram shows another arrangement using multiple polarizers/wave plates. In this example, a light source 600 illuminates an analyte 604 in a channel 602, which emits light 606 in response. The emitted light 606 passed through a beam splitter 608, which may be polarization dependent or independent. The split light is directed to two or more polarizers/wave plates 610, 611 that are oriented at an angle (e.g., perpendicular) to the flow direction 609 of the channel 602, which is normal to the plane of the drawing. Two or more optical detectors 612, 613 (e.g., SiPMs) process the different components of light that pass through the polarizers/wave plates 610, 611. Note that this scheme can be combined with that shown in FIG. 4, e.g., using a two-dimensional array of detectors as shown in FIG. 7.

Figure 7:
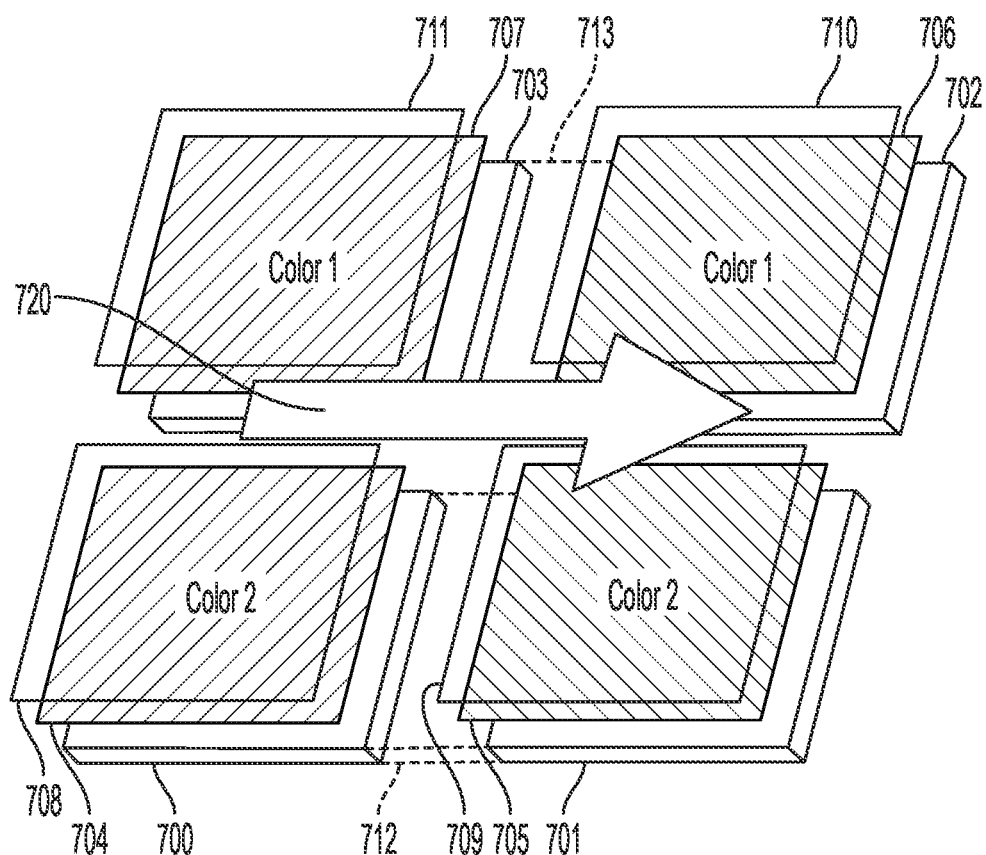
FIG. 7 is a diagram of a two dimensional arrangement of detectors according to an example embodiment.

In FIG. 7, an example embodiment shows four optical detectors 700-703 and four polarizers 704-707. Arrow 720 represents a direction over which the analyte image passes. In this example, polarizers 704, 707 have a first polarization direction and polarizers 705, 706 have a second polarization direction. Thus this arrangement has a pair of silicon photomultiplier detectors for each of the polarization components, namely pair 700, 703 and pair 701, 702. Also note that the function of each pair may be performed by a single optical detector, as indicated by dashed lines 712, 713. In such a case, a time domain signal may be analyzed to determine when the analyte image is over different polarizers, e.g., 704 and 705 for a single detector that takes the place of detectors 700, 701.

In this example, color filters 708-711 are shown over respective optical detectors 700-703 and polarizers 704-707. Further, filters 708-709 affect a first color spectrum and filters 710-711 affect a second color spectrum. In this way, the arrangement in FIG. 7 can be used to achieve polarization detection in multiple color channels. Note that other combinations of color filters may be used, and this concept may be extended to more than two color channels and more than two polarization components.

One of the advantages of characterizing fluorescence polarization using S is that it distinguishes circularly polarized light from unpolarized light. This contrasts with the common method using the "polarization" $P=(P_{90}-P_0)/(P_{90}+P_0)$, where $P_{90}$ and $P_0$ are the powers measured with a linear analyzer at 90° and 0°, which implicitly lumps together the unpolarized components and circularly polarized components. The common method works because fluorescence emission is mainly composed of linearly polarized and unpolarized light. However, several mechanisms can give rise to a circularly polarized component in the fluorescence emission including birefringence, circular dichroism, and circularly polarized luminescence. Indeed, circularly polarized luminescence is sometimes defined to be equal to $P_l-P_r$, the difference between the power with a right/left hand circular analyzer, which is the same as $S_3$.

Figure 8A:
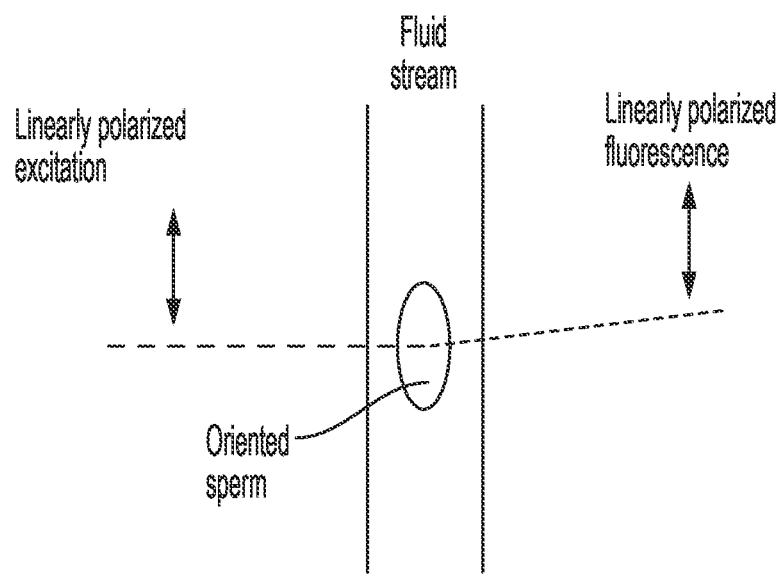
FIGS. 8A and 8B are diagrams illustrating how misorientation of a sample can affect polarization according to an example embodiment.
Figure 8B:
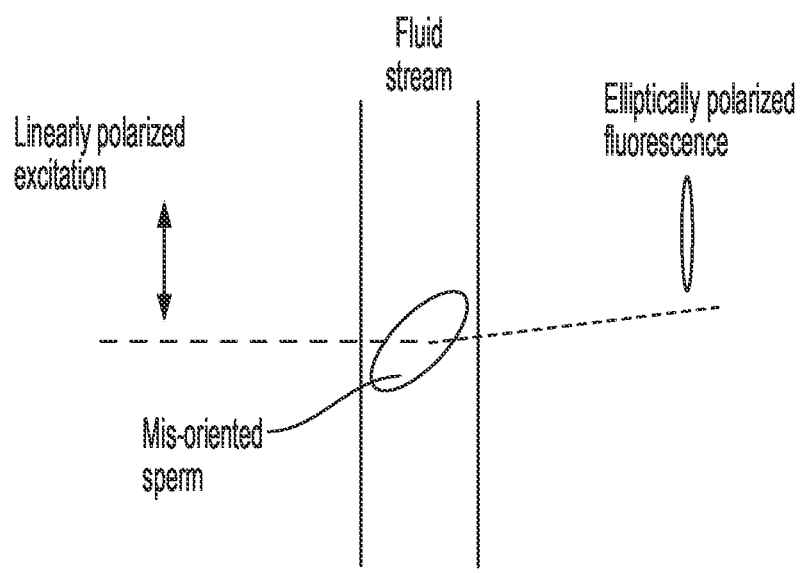

Determining the circularly polarized component may be valuable either because (1) it contains some valuable information about the cell population, or (2) it contains some information about a noise source. For example, sperm cells are known to be birefringent with the optic axis along the long axis of the head. For sperm sorting, variations in the orientations of the sperm in the interrogation region are a noise source. Using an excitation with a polarization aligned with the fluid stream, the polarized component of the fluorescence is also linearly polarized for an oriented sperm as shown in FIG. 8A. However, for a mis-oriented sperm, the polarized part of the fluorescence will have a small circular component due to the birefringence of the sperm and will be elliptically polarized, as shown in FIG. 8B. Thus the circular polarization contains information about the sperm orientation that could be used to correct for the noise source from variability in orientation.

Figure 9A:
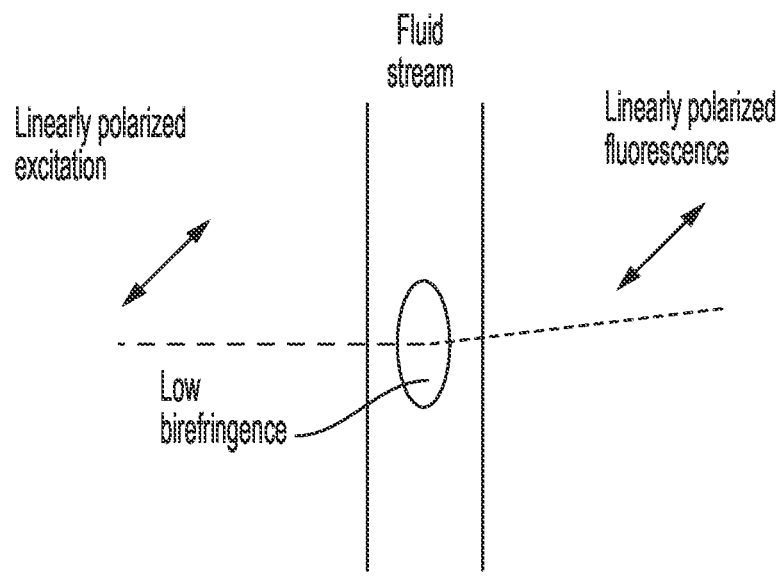
FIGS. 9A and 9B are diagrams illustrating how birefringence of a sample can affect polarization according to an example embodiment.
Figure 9B:
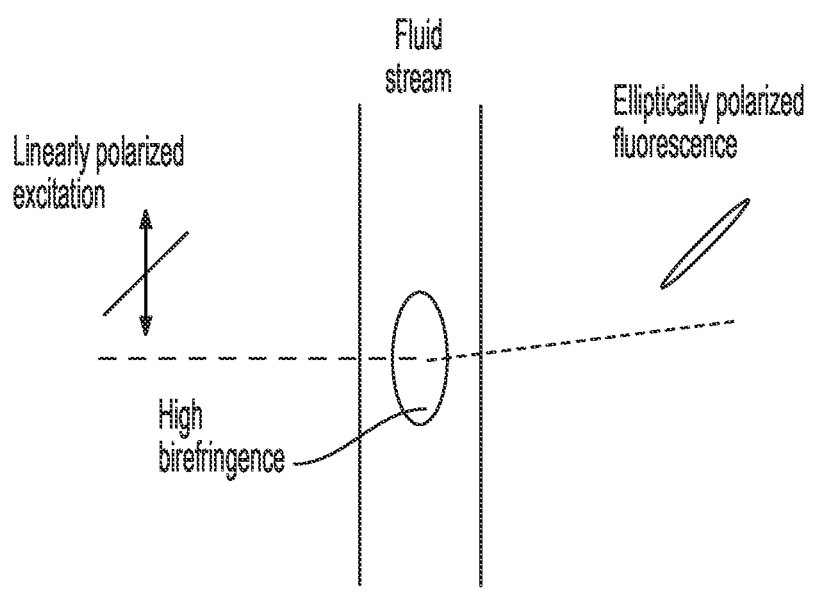

Regarding information about the cell population, some reports indicate that sperm birefringence correlates with viability. Thus a measurement of the birefringence has a high value because it can indicate viability. The birefringence may be measured by using an excitation that is polarized at 45° to the vertical. For a sperm with low/no birefringence, the polarized part of the fluorescence is linearly polarized at 45°, as shown in FIG. 9A. For a sperm with higher birefringence, the polarized part of the fluorescence is elliptically polarized, as shown in FIG. 9B. Thus in this case the circular component contains information about the sperm birefringence.

To calculate the magnitude of this effect, the Jones matrix M for a birefringent sample with a retardance η and with eigen-axes oriented at 45° with respect to the emission polarization is given by Equation (3) below.

$$M = \begin{pmatrix} 1 & -i\eta/2 \\ -i\eta/2 & 1 \end{pmatrix} \quad (3)$$

In this coordinate system the excitation polarization is (1, 0), so after the sample, the polarization is (1, $-i\eta/2$). Decomposing this into the circularly polarized components, it can be shown that the $I_l-I_r=\eta$. A sperm with a birefringent retardance of 1 nm at an emission wavelength of 480 nm will thus exhibit a fluorescence difference of around 0.3% between the l and r circular channels, assuming the overall output is 50% polarized and 50% un-polarized. This small difference in fluorescence would be difficult to measure. Birefringence has been reported for a variety of cell types including red blood cells, sperm cells and neurons. Red blood cells have much higher birefringence than sperm cells, up to 10 nm has been recorded. It has been shown that the retardance can change by as much as two times as a result of a malaria infection.

The embodiments described herein can be applied in cancer research and cancer detection. Methylene blue (MB) was reported to be a quantitative marker for breast and brain cancer detection using fluorescence polarization imaging at single cell level. However, imaging can only be applied in limited field of views thus limiting number of cells. And there is currently no compatible technology for high speed sorting based on imaging results, preventing large-scale downstream analysis. It is promising to adapt this FDA-approved dye in flow cytometry measurement. Methylene blue stained cells (from liquid biopsy sample or from controlled experiment) are run through a flow cytometer integrated with the proposed detection module. Fluorescence polarization of each cell can be quantified according to Equation (1). Based on the quantitative results, cells can be sub-grouped accordingly or control variables can be investigated statistically. Drug screening and rare population identification/isolation will be greatly benefit.

Figure 10:
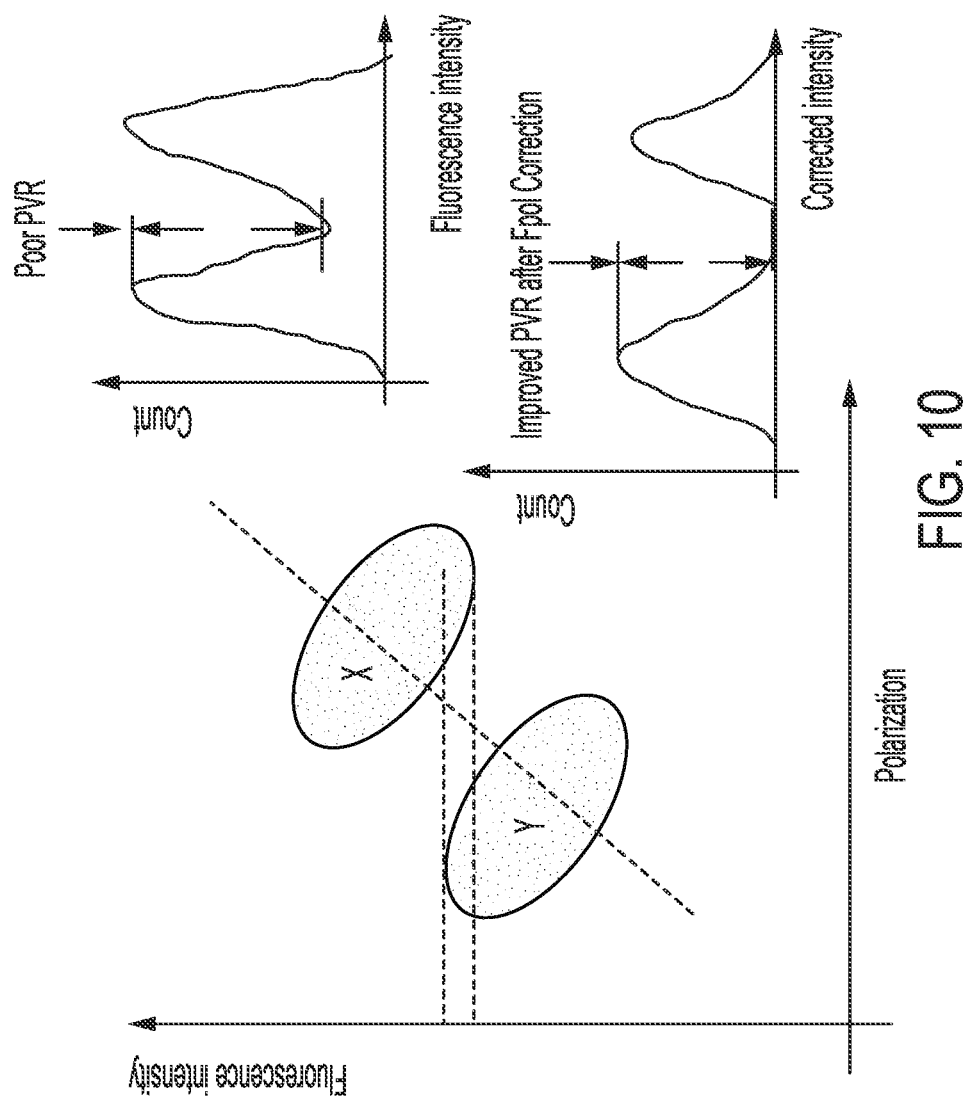
FIGS. 10-12 are diagrams showing how polarization measurements can be used to correct intensity measurements according to example embodiments.

The embodiments described herein can be applied in XY sperm sorting application where DNA binding dyes (e.g., Hoechst 33342) are used to display the difference in DNA amount between sperms containing X/Y chromosome. Uncertainty exists in the staining process that will slightly change the ratio between the number of DNA base pairs and the number of dye molecules actually bound from cell to cell. As a result, noise will be added onto the ideally linear relationship between the DNA amount and measured fluorescence intensity. The noise will result in broadening of the X/Y population distribution and poorer peak-valley-ratio (PVR) which is a parameter indicative of good quality sorting to happen. Different DNA/dye ratio will result in different inter-dye distance, which will cause different level of energy transfer between dyes. The smaller the DNA/dye ratio, the smaller the effective distance between dyes, the stronger the energy transfer will be. Energy transfer will depolarize the fluorescence signal from DNA binding dyes. Using the proposed polarization detector, fluorescence intensity can be derived by $I=I_\parallel+I_\perp$ while fluorescence polarization P is measured simultaneously. As depicted in FIG. 10, by properly account for the staining variable, an improved PVR could be achieved and greatly benefit the sorting activity.

Figure 11:
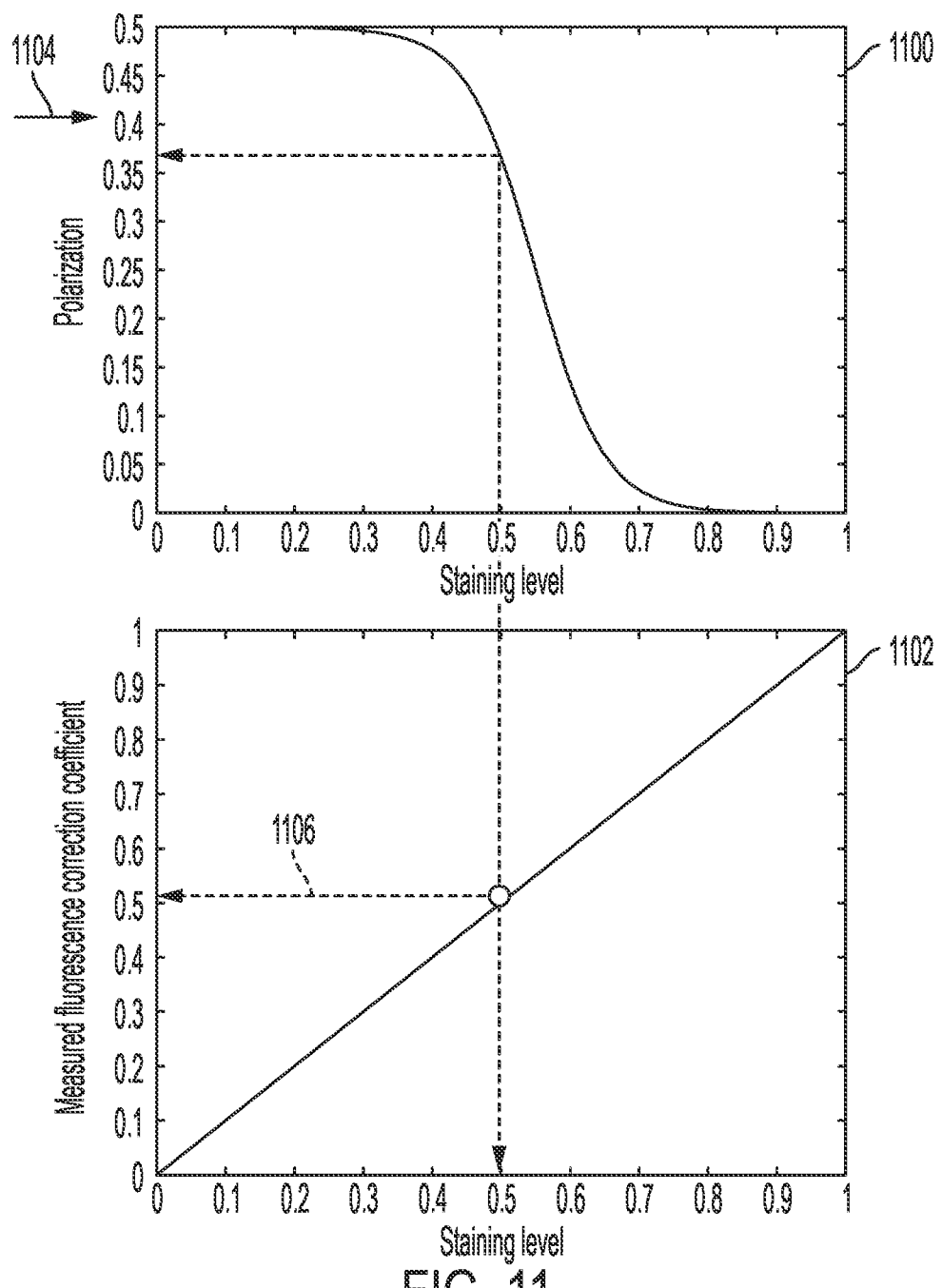

In FIG. 11, a set of graphs illustrates an example of how to correct the measured fluorescence intensity according to the polarization information. A cell, A, has $C_0$ binding sites, $\alpha_1\%$ of which are bound to a dye. The measured fluorescence intensity is proportional to $\alpha_1\% \times C_0$. A second cell, B, which also has $C_0$ binding sites but have $\alpha_2\%$ of them bound to a dye will have fluorescence intensity proportional to $\alpha_2\% \times C_0$. In this case, it could be wrong to interpret that A and B have different number of binding sites based on the measured fluorescence intensity.

To correct for that, the binding ratio, α, can be quantified by the measured fluorescence polarization, P, as shown in graph 1100. It is most true in cases where binding sites are very close to each other (within 10 nm), e.g., DNA binding dyes. When the staining level is high, the average distance between two dyes can fall below 10 nm, in which case, fluorescence resonance energy transfer (FRET) can happen between the two dyes, which will depolarize the fluorescence emission. Thus, by adjusting the measured fluorescence intensity according to P, a better indication can be obtained of the true count of the binding sites in these two cells.

Generally, this involves measure fluorescence polarization, e.g., as indicated by example measurement 1104. Referring to the polarization/staining level characterization curve in graph 1100, the staining level can be determined. Note that the data in graph 1100 can be pre-characterized or estimated using the samples. Using the staining level (0.5 in this example) the corresponding fluorescence correction coefficient 1106 is checked at graph 1102 for given staining level. The measured fluorescence is then corrected using the correction coefficient 1106. Graph 1102 indicates that measured fluorescence intensity is linearly proportional to the staining level given a fixed amount of binding sites.

Figure 12:
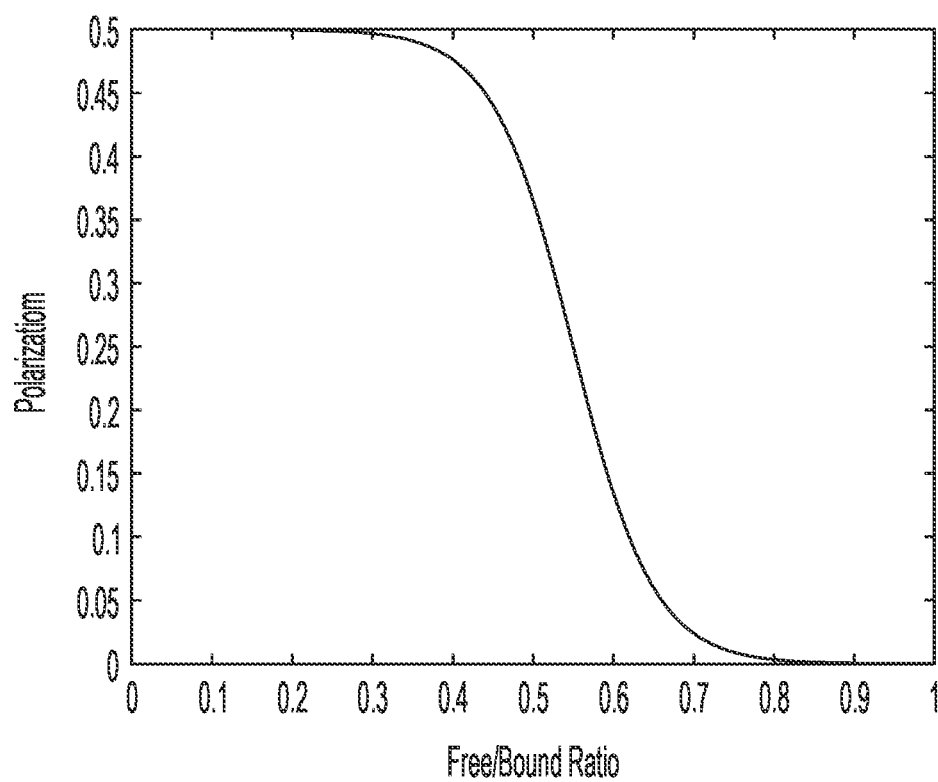

In another case, there can be free dyes present in the volume under interrogation which affect the measured fluorescence intensity. Under linearly polarized excitation, free dyes will have more depolarized fluorescence emission compared to the bound dyes. By measuring the fluorescence polarization, the free/bound dye ratio can be determined and the fluorescence intensity from the bound dyes can be corrected, which represent the number of binding sites present in the cell. An example of this is shown in FIG. 12.

Figure 13:
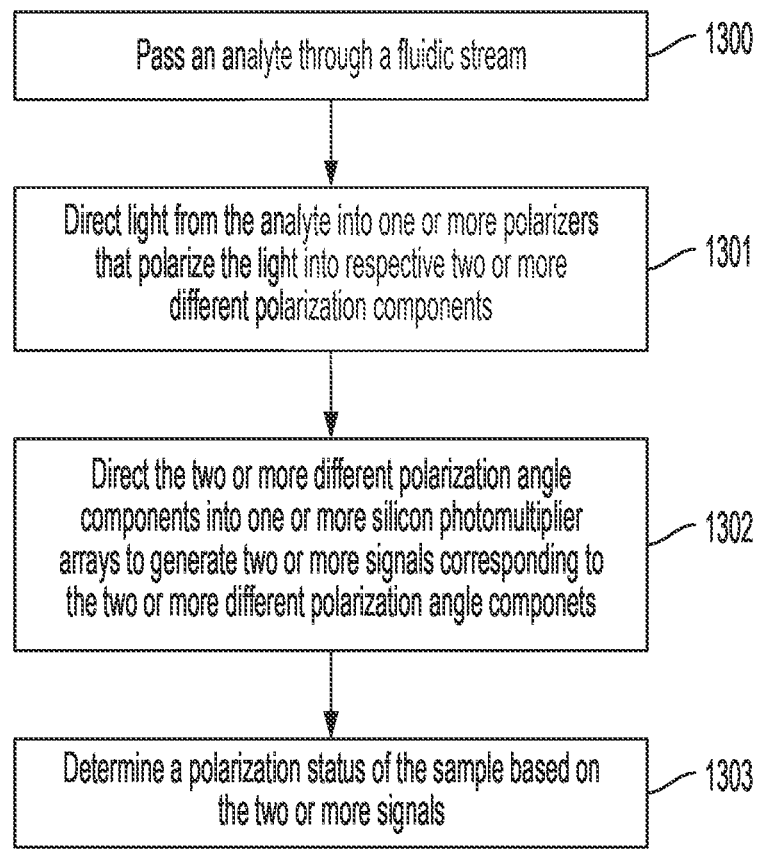
FIGS. 13-15 are flowcharts of methods according to example embodiments.

In FIG. 13, a flowchart shows a method according to another example embodiment. The method involves passing 1300 an analyte through a fluidic stream. Light from the analyte is directed 1301 into one or more polarizers that polarize the light into respective two or more different polarization components. The two or more different polarization components are directed 1302 into one or more optical detectors to generate two or more signals corresponding to the two or more different polarization components. A polarization status of the sample is determined 1303 based on the two or more signals.

Figure 14:
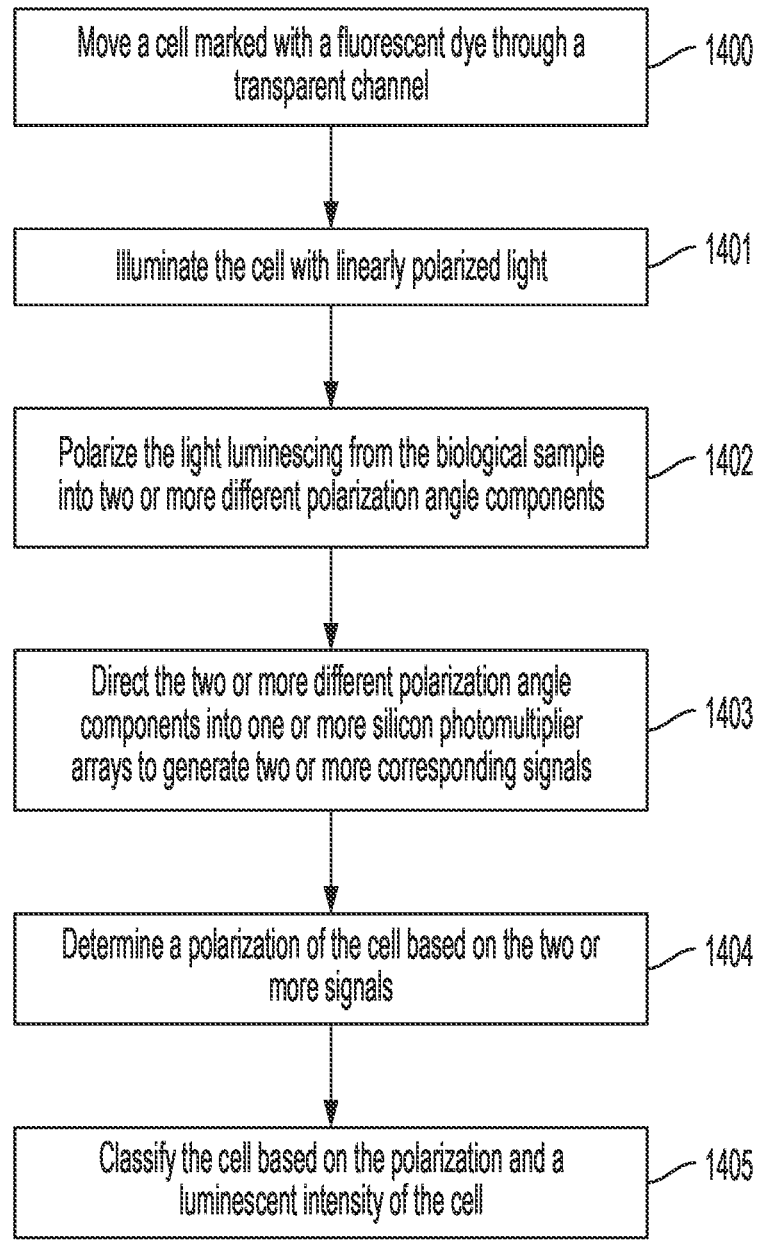

In FIG. 14, a flowchart shows a method according to another example embodiment. The method involves moving 1400 a cell marked with a fluorescent dye through a transparent channel. The cell is illuminated 1401 with linearly polarized light causing light to luminesce from the biological sample. The light luminescing from the biological sample is polarized 1402 into two or more different polarization angle components. The two or more different polarization angle components are directed 1403 into one or more optical detectors to generate two or more corresponding signals. A polarization of the cell is determined 1404 based on the two or more signals. The cell is classified 1405 based on the polarization and a luminescent intensity of the cell. The classification 1405 may involve detecting a drug in the cell (e.g., binding affinity of a drug in the cell or a susceptibility of the cell to the drug), determining whether a sperm cell has an X or Y chromosome, and/or detecting a cancer cell.

Figure 15:
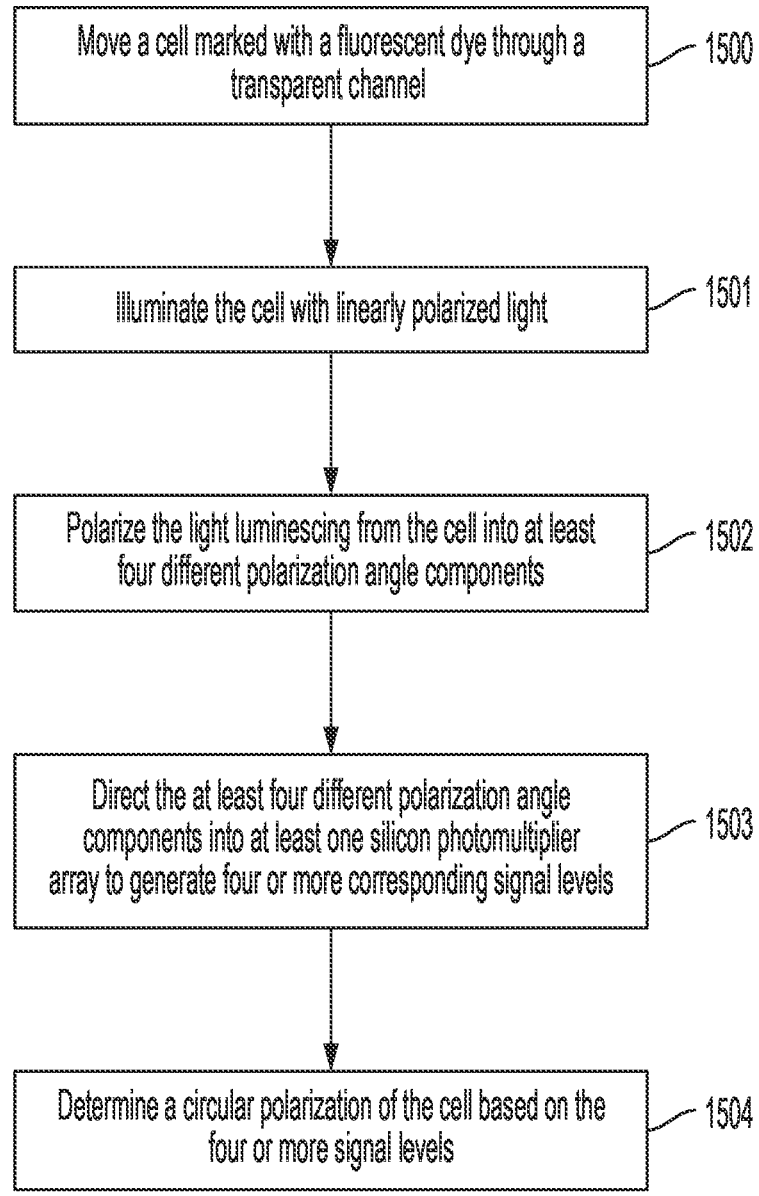

In FIG. 15, a flowchart shows a method according to another example embodiment. The method involves moving 1500 a cell marked with a fluorescent dye through a transparent channel. The cell is illuminated 1501 with linearly polarized light. The light luminescing from the cell is polarized 1502 into at least four different polarization angle components. The at least four different polarization angle components are directed 1503 into at least one optical detector to generate four or more corresponding signals. A circular polarization of the cell is determined 1504 based on the four or more signals The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. An analyzing system, comprising:
a detection area comprising a transparent window past which an analyte moves and emits or transmits light;
one or more polarizing elements that receive and polarize the light into respective two or more different polarization components;
one or more optical detectors that receive the respective two or more polarization components and generate respective at least two signals in response; and
a processor coupled to the optical detectors and configured to determine a polarization status of the light from the analyte based on the at least two signals.

2. The analyzing system of claim 1, wherein the light from the analyte produces a moving image that passes by the one or more polarizing elements.

3. The analyzing system of claim 2, wherein the one or more polarizing elements comprises two or more polarizing elements, and the one or more optical detectors comprises one optical detector that overlaps the two or more polarizing elements.

4. The analyzing system of claim 3, wherein the two or more polarizers are arranged linearly such that the moving image passes sequentially through the two or more polarizers.

5. The analyzing system of claim 3, wherein the processor determines the polarization status of the light via a time domain signal of the one optical detector, two or more values of the time domain signal at respective two or more time segments corresponding to the respective two or more polarizing elements.

6. The analyzing system of claim 3, wherein the one optical detector comprises a silicon photomultiplier.

7. The analyzing system of claim 1, wherein the processor uses spatial modulation to gain at least one of image information and color co-localization of the image.

8. The analyzing system of claim 7, wherein the image information comprises at least one of size and shape of the analyte.

9. The analyzing system of claim 1, wherein the polarization status is determined by the processor at greater than 10 kHz.

10. The analyzing system of claim 1, wherein determining the polarization status comprises determining a circular polarization component of the light and a linear polarization component of the light.

11. The analyzing system of claim 1, further comprising a light source that illuminates the analyte causing transmission of the light from the analyte.

12. The analyzing system of claim 1, wherein the polarization status comprises a fluorescence polarization, and wherein the processor is further configured to use the fluorescence polarization to correct a fluorescence intensity detected by the analyzing system.

13. The analyzing system of claim 1, wherein the analyte is moved within of a jet-in-air channel or a microfluidic channel.

14. A method comprising:
passing an analyte past a detection area;
receiving light from the analyte at one or more polarizing elements that polarize the light into respective two or more different polarization angle components;
directing the two or more different polarization angle components into one or more optical detectors to generate two or more signals corresponding to the two or more different polarization angle components; and
determining a polarization status of the analyte based on the two or more signals.

15. The method of claim 14, wherein the light from the analyte produces a moving image that passes by the one or more polarizing elements.

16. The method of claim 15, wherein the one or more polarizing elements comprises two or more polarizing elements arranged linearly such that the moving image passes sequentially through the two or more polarizers, and the one or more optical detectors comprises one optical detector that overlaps the two or more polarizing elements.

17. The method of claim 16, wherein the polarization status of the light is determined by a time domain signal of the one optical detector, two or more values of the time domain signal at respective two or more time segments corresponding to the respective two or more polarizing elements.

18. The method of claim 14, further comprising using spatial modulation to gain at least one of image information and color co-localization of the image.

19. The method of claim 18, wherein the image information comprises at least one of size and shape of the analyte.

20. The method of claim 14, wherein determining the polarization status comprises determining a circular polarization component of the light and a linear polarization component of the light.

\* \* \* \* \*